United States Patent [19]

Whittaker

[11] Patent Number: 5,584,464
[45] Date of Patent: Dec. 17, 1996

[54] QUICK ADJUSTMENT HEAVY DUTY MACHINERY MOUNT

[75] Inventor: Wayne H. Whittaker, Horton, Mich.

[73] Assignee: Unisorb Inc., Jackson, Mich.

[21] Appl. No.: 389,209

[22] Filed: Feb. 15, 1995

[51] Int. Cl.⁶ ........................................ A16M 1/00
[52] U.S. Cl. .............. 248/678; 248/188.2; 248/346.02; 411/80
[58] Field of Search ...................... 248/677, 678, 248/649, 188.2, 188.3, 188.8, 178.1, 346.01, 346.02, 346.07; 411/75, 79, 80; 108/147

[56] References Cited

U.S. PATENT DOCUMENTS

| | | | |
|---|---|---|---|
| 472,967 | 4/1892 | Tyler. | |
| 620,481 | 2/1899 | Moody | 411/79 |
| 802,394 | 10/1905 | Hill. | |
| 2,164,615 | 7/1939 | Mafera | 254/104 |
| 2,756,956 | 7/1956 | Anderson | 248/178.1 |
| 2,779,559 | 1/1957 | Bertuch | 248/24 |
| 3,030,730 | 4/1962 | Costar | 45/139 |
| 3,306,562 | 2/1967 | Bellefleur | 248/178.1 X |
| 3,325,145 | 6/1967 | Bertuch | 254/104 |
| 3,349,662 | 10/1967 | Williams | 411/75 X |
| 3,954,244 | 5/1976 | Gopstein | 248/349.1 |
| 4,114,845 | 9/1978 | Weisenberger | 248/677 X |
| 5,253,963 | 10/1993 | Ries | 411/75 |
| 5,253,964 | 10/1993 | Swemmer | 411/79 |

OTHER PUBLICATIONS

"Master Catalog and Engineering Guide", pp. 10–12, Unisorb Machinery Installation Systems, Jul., 1992.

Primary Examiner—Korie Chan
Attorney, Agent, or Firm—Beaman & Beaman

[57] ABSTRACT

A vertically adjustable mount for heavy duty machinery utilizing three wedges wherein a screw operated actuating wedge is located between upper and lower wedges. All the wedges include engaging cam surfaces obliquely related to the longitudinal direction of relative wedge movement during adjustment, and the range of vertical adjustment is extended, and quickly initially approximated, by providing the upper and lower wedges with longitudinally spaced openings, constituting sets, wherein a nut mounted upon the actuating wedge screw may be selectively positioned within a set of openings to adjust the range of actuating wedge movement while maintaining a relative short length of the actuating wedge screw.

5 Claims, 2 Drawing Sheets

QUICK ADJUSTMENT HEAVY DUTY MACHINERY MOUNT

BACKGROUND OF THE INVENTION

1. Field of the Invention

The invention pertains to vertically adjustable machinery mounts utilizing wedges having oblique engaging cam surfaces whereby relative translation between wedge engaging surfaces by a rotating screw and nut adjustment varies the height of the assembled mount.

2. Description of the Related Art

Supports or mounts for machinery are known wherein the vertical dimension of the mount is adjusted by displacing engaging wedges having cam surfaces obliquely related to the axis of wedge adjustment wherein relative movement between the wedges will alter the vertical "thickness" of the assembly and thereby provide an adjustable support for the machinery or other heavy equipment.

Wedge type machinery mounts have the advantage of being economical and capable of firmly and rigidly supporting heavy weights, and yet provide a vertical adjustment The arrangement of the elements of a wedge machinery support are such that the total weight being borne by the unit is directly imposed upon the wedges and no weight is imposed upon the adjusting structure.

Adjusting structure commonly employed to translate the wedges of a wedge type machinery mount commonly consists of a threaded screw associated with one of the wedges for translating the associated wedge relative to a stationary wedge. Each of the wedges includes cam surfaces obliquely related to the direction of wedge movement, and the extent of vertical adjustment is determined by the angle of the engaging wedge surfaces, and the relative displacement occurring between the wedges.

As will be appreciated, with a wedge type machinery mount, the greater the relative movement between the wedges, the greater the vertical adjustment achieved. However, for practical reasons, the dimensions of the wedge type machinery mount must be limited. For instance, sufficient cam surface engaging areas must be maintained between the displaceable wedges to provide an adequate support base and sufficient area to prevent galling and excessive surface pressures. However, when a screw is used to relatively displace the wedges an excessively long screw is required if extensive vertical adjustment is desired. In known wedge type machinery mounts the location of the nut associated with the adjusting screw is fixed relative to at least one of the wedges thereby limiting the range of relative wedge adjustment by the length of the adjusting screw.

OBJECTS OF THE INVENTION

It is an object of the invention to provide a quick adjustment heavy duty machinery mount of the wedge type wherein relatively displaceable wedges using a threaded screw and nut adjustment are capable of selective location of the nut relative to the non-translatable wedge to extend the range of vertical mount adjustment for a given length of adjusting screw.

An additional object of the invention is to provide a vertically adjustable machinery mount utilizing three wedges wherein an actuating wedge is located intermediate upper and lower wedges and an adjusting screw is mounted upon the actuating wedge and the adjusting screw includes a nut connected to both the upper and lower wedges in a pre-selected manner wherein the nut maintains the relative position of the upper and lower wedges and permits the actuating wedge to be displaced relative thereto.

A further object of the invention is to provide a quick adjustment machinery mount utilizing upper and lower wedges having an actuating wedge located therebetween wherein a rotatable adjusting screw is mounted upon the actuating wedge and the upper and lower wedges are each provided with nut receiving openings spaced relative to each other in the direction of the adjusting screw length wherein reception of a nut mounted upon the adjusting screw within selected openings permits an extended range of relative movement between the upper and lower wedges and actuating wedge for a given length of actuating screw.

Another objective of the invention is to provide a quick adjustment machinery mount utilizing a threaded shaft operated actuating wedge located between upper and lower wedges wherein the longitudinal length of all three wedges is substantially equal and yet an extended range of vertical adjustment is possible due to selective mounting of the threaded shaft's nut with the upper and lower wedges.

SUMMARY OF THE INVENTION

A quick adjustment heavy duty machinery mount in accord with the invention includes identical upper and lower wedges and an actuating wedge is located between such upper and lower wedges. The upper wedge includes the lower cam surface while the lower wedge includes an upper cam surface, and these cam surfaces are obliquely related to the longitudinal length of the associated wedge. The actuating wedge includes obliquely related cam surfaces engaging the cam surfaces of the upper and lower wedges, and all of the cam surfaces are of a planar configuration. The upper and lower wedges include flanges extending toward each other along their lateral sides and the actuating wedge is located intermediate such flanges wherein the flanges define a guide for the actuating wedge as it is adjustably translated between the upper and lower wedges.

The actuating wedge includes an adjusting screw rotatingly mounted and axially fixed thereon parallel to the longitudinal length of the actuating wedge, and centrally located thereon. A nut member includes a threaded bore through which the threaded shaft extends, and the nut includes extensions received within aligned openings defined in the upper and lower wedges. In this manner the nut will be "fixed" with respect to the upper and lower wedges maintaining their relative relationship, while rotation of the adjusting screw translates the screw through the nut displacing the actuating wedge relative to the upper and lower wedges permitting the upper and lower wedges to be separated as desired to provide the vertical adjustment.

In order to permit an extended range of vertical adjustment between the upper and lower wedges with a relatively short adjusting screw the upper and lower wedges are each provided with a set, at least two, of openings for receiving the nut. The openings defined on a common upper or lower wedge are spaced relative to each other relative to the associated wedge longitudinal axis and length of the adjusting screw whereby openings defined on the upper and lower wedges may be vertically aligned. The nut is selectively located within aligned openings, and in this manner the position of the nut with respect to the longitudinal length of the upper, lower and actuating wedges can be selectively determined.

By locating the nut within the desired upper and lower wedge openings the axial spacing between the openings on a common wedge permits the location of the actuating wedge and adjusting screw to be selectively quickly initially adjusted relative to the upper and lower wedges with a minimum of screw rotation, and permits a greater extended range of movement of the actuating wedge than is possible wherein the nut may not be selectively positioned relative to the upper and lower wedges.

The use of a plurality of nut receiving openings within the upper and lower wedges permits the three wedges of the mount assembly to be substantially the same length, and the length of the adjusting screw is less then wedges' length, and a greater range of adjustment between the actuating wedge and upper and lower wedges is permitted than would otherwise be possible. Accordingly, the use of a plurality of nut receiving openings within the upper and lower wedges permits a machinery mount of concise dimensions to have a maximum degree of vertical adjustment.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

A heavy duty machinery mount in accord with the inventive concepts is generally indicated at 10, and basically consists of an upper wedge 12, a lower wedge 14, and an actuating wedge 16 located intermediate the wedges 12 and 14.

Figure 1:
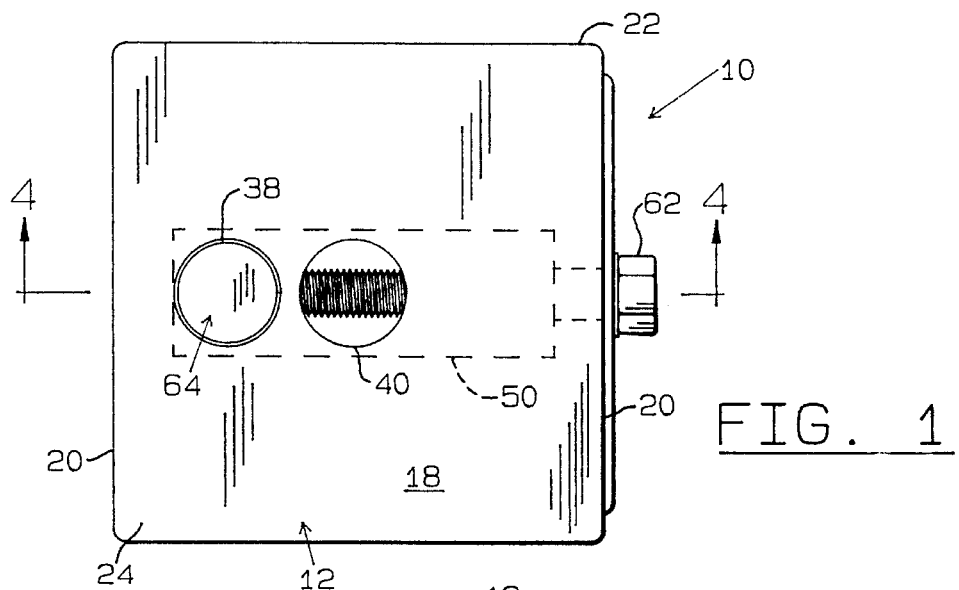
FIG. 1 is a top plan view of the assembled machinery mount illustrating the wedges in a substantially vertically aligned relationship.

The upper and lower wedges 12 and 14 are identical, each consisting of a substantially square body 18 formed of cast iron or steel and identical reference numerals are used in their description. The body 18 includes end edges 20 and lateral edges 22, and each of the wedges' longitudinal axis is parallel to the lateral edges 22 as occurring at Section 4—4 as represented in FIG. 1. The upper wedge 12 includes a planar upper surface 24 and a cam or wedge surface 26 obliquely related to the upper surface 24 as will be appreciated from FIG. 4. The angle of inclination of the cam surface 26 relative to the surface 24 constitutes a frictional "locking" angle, preferably of 4°. The lower wedge 14 includes the planar lower surface 28 and a cam or wedge surface 30 FIG. 4.

Figure 2:
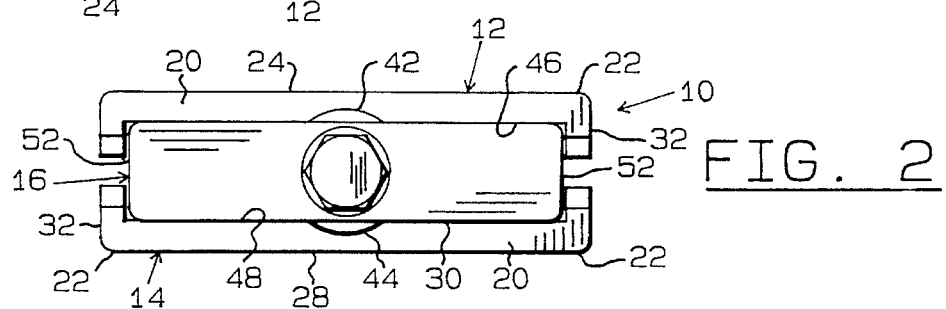
FIG. 2 is an elevational end view as taken from the right of FIG. 1.
Figure 3:
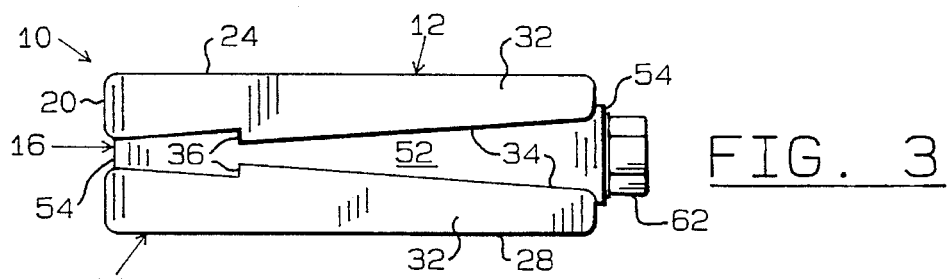
FIG. 3 is a side elevational view as taken from the left of FIG. 2.

A flange 32 is formed on each of the wedges 12 and 14 at the lateral edges 22, as best illustrated in FIGS. 2 and 3. The flanges 32 of the wedges extend toward each other beyond the associated cam surface 26 or 30 and constitute guides for the actuating wedge 16 as later described. Each of the flanges 32 is defined by an inclined edge 34 parallel to the cam surface of the associated wedge, and a step 36 is formed in the flanges defining the end of the flanges in the direction of convergence whereby the flanges will not interfere with each other at minimal dimensional adjustment of the mount 10.

The wedges 12 and 14 are each provided with a cylindrical nut opening 38 having an axis which intersects the longitudinal axis of the associated wedge, and each wedge 12 and 14 also includes a second cylindrical nut receiving opening 40 identical to 38, but axially located to the right of opening 38 as viewed in the drawings. In one mode of mount assembly the nut openings 38 will be coaxially aligned with the each other and the openings 38 of the wedges constitute a set for receiving the adjustment nut as later described. In a second mode of mount assembly, the nut openings 40 will be aligned with each other and together constitute another set of nut receiving openings as late described.

Figure 4:
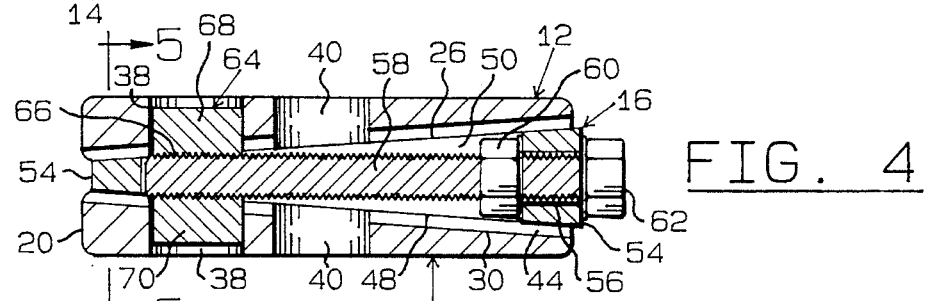
FIG. 4 is an elevational sectional view taken along the machinery mount longitudinal axis at Section 4—4 of FIG. 1.
Figure 5:
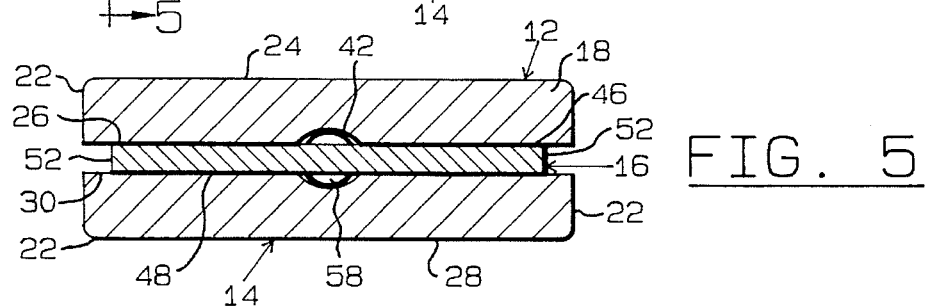
FIG. 5 is an elevational sectional view as taken along of Section 5—5 of FIG. 4.

As appreciated in FIGS. 2, 4 and 5, an adjusting screw clearance recess 42 is defined in the upper wedge 12 intersecting the end edges 20 and the recess 42 comprises a cylindrical segment intersecting the cam surface 26. In a similar manner the lower wedge 14 is provided with a threaded screw clearance recess 44 in opposed relationship to the recess 42, the recesses 42 and 44 being coaxial with the longitudinal axis of the associated wedges.

The actuating wedge 16 is located intermediate the upper wedge 12 and the lower wedge 14 having a longitudinal axis lying within Section 4—4, FIG. 1, and the actuating wedge 16 includes an upper obliquely orientated cam surface 46 engaging the cam surface 26 of wedge 12. Also wedge 16 includes a lower cam surface 48 which slidingly engages the cam surface 30 of the lower wedge 14. The central portion of the actuating wedge 16 includes a rectangular opening 50 shown in dotted lines in FIG. 1 and the wedge 16 includes lateral sides 52 parallel to each other and spaced apart a distance slightly less than the distance separating the flanges 32 of the wedges 12 and 14. Additionally, the actuating wedge 16 includes ends 54. A cylindrical bore 56 is defined in the larger vertical end dimension of the actuating wedge 16, i.e. the right end of wedge 16 as shown in FIG. 4. The bore 56 is coaxial with the wedge longitudinal axis and intersects the associated end 54 and the wedge central opening 50. A threaded screw shaft 58 is rotatably received within bore 56, and the shaft 58 extends through the opening 50 along the longitudinal axis of wedge 16. The shaft 58 is rotated by a hexagonal torque drive head 62 located at its outer end and axial displacement of the shaft 58 relative to the wedge 16 is prevented by the spacer nut or shoulder 60 mounted upon the shaft 58 located adjacent the inside right end of the opening 50, FIG. 4. By mounting a wrench upon hex head 62 the shaft 58 may be rotated in the direction desired, and the spacer 60 and hex head 62 will restrain the threaded shaft against axial displacement relative to wedge 16.

The primary actuator nut 64 includes a threaded bore 66 receiving the threaded screw shaft 58. The nut 64 is of a cylindrical configuration having an axis perpendicular to the axis of the threaded bore 66 and the diameter of the cylindrical nut configuration is slightly less than the diameter of the nut receiving openings 38 and 40 formed in the wedges 12 and 14. The nut 64 includes an upper cylindrical portion 68, and a lower cylindrical portion 70.

Assembly of the machinery mount 10 merely consists of positioning the actuating wedge 16 between the upper wedge 12 and the lower wedge 14 in the manner shown in the drawings. Because the spacing between the actuating wedge lateral edges 52 is slightly less than the flanges 32 the flanges will extend over the actuating wedge lateral sides 52 as shown in FIGS. 2 and 3 and the flanges thereby guide the relative movement between wedge 16 and wedges 12 and 14.

Prior to assembling the wedges constituting the machinery mount 10 it is necessary to determine the approximate vertical dimension of the machinery mount 10 desired. This vertical dimension is the dimension separating the surface 24 of the upper wedge 12 and the surface 28 of the lower wedge 14. In the desired installation the lower wedge surface 28 will normally rest upon the floor or other supporting surface, while the upper wedge surface 24 will be engaged by the machinery leg or base, and prior to assembling and positioning the machinery mount 10 it is usually possible to approximately determine the vertical dimension of the mount 10 that is going to be desired.

Figure 6:
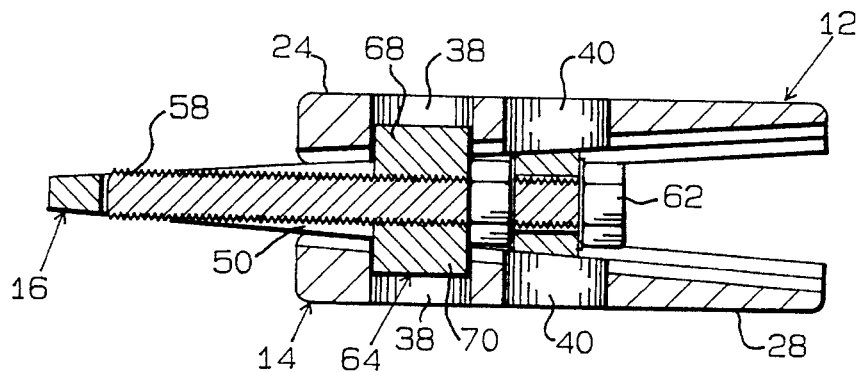
FIG. 6 is an elevational sectional view such as taken along Section 4—4 illustrating the position of the wedges and nut to produce the maximum vertical mount dimension.

Prior to assembling the wedges 12, 14, and 16 it will be determined which set of nut openings should receive the primary nut 64. If it appears that the final height of the mount 10 will be close to the maximum vertical adjustment possible the nut 64 will be located within the nut openings 38 of the upper wedge 12 and lower wedge 14 as shown in FIGS. 4 and 6. Accordingly, the nut upper portion 68 will be located within the nut opening 38 of the upper wedge 12 while the nut cylindrical portion 70 will be located within the nut opening 38 of the lower wedge 14. As the primary nut 64 is received within the nut openings 38 of both wedges 12 and 14 the nut 64 serves to maintain these wedges in alignment with each other and maintain the desired assembly of all three wedges.

With the nut 64 located in the nut openings 38 the nut 64 will be located close to the left end of the screw shaft 58, and the wedges 12, 14, and 16 will be in substantial vertical alignment defining the minimum longitudinal dimension of the assembly as represented in FIGS. 1–4. This relationship can also be achieved if the nut 64 is located within the nut openings 40, and the nut 64 is located approximately midway along the threaded shaft 58.

The maximum vertical dimension of the mount 10 is achieved when the threaded shaft 58 is threaded its maximum extent into the nut 64 as shown in FIG. 6. This relationship moves the actuating wedge 16 its maximum extent in the direction of the converging cam surfaces 26 and 30 of the wedges 12 and 14, respectively, producing the maximum separation of the wedge surfaces 24 and 28. When the nut 64 is located within the nut openings 38 and is positioned on the shaft 58 as shown FIG. 4 an intermediate vertical dimension of the mount 10 is produced.

Figure 7:
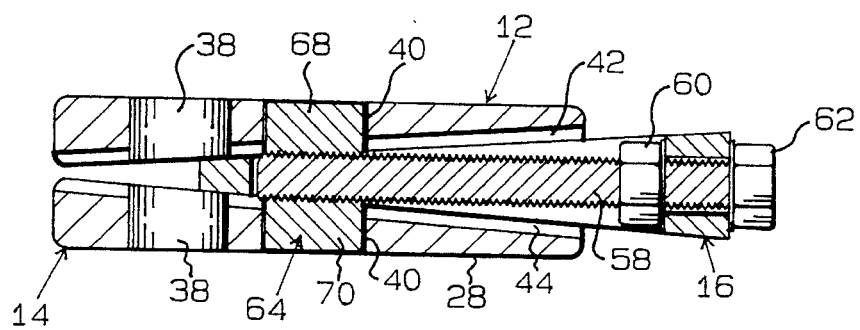
FIG. 7 is an elevational sectional view of the assembled machinery mount as taken along the longitudinal axis wherein the nut is mounted within an alternate set of nut receiving openings defined within the upper and lower wedges with respect to the relationship shown in FIGS. 4 and 6, and the elevational dimension of the machinery mount being at its minimum.
Figure 8:
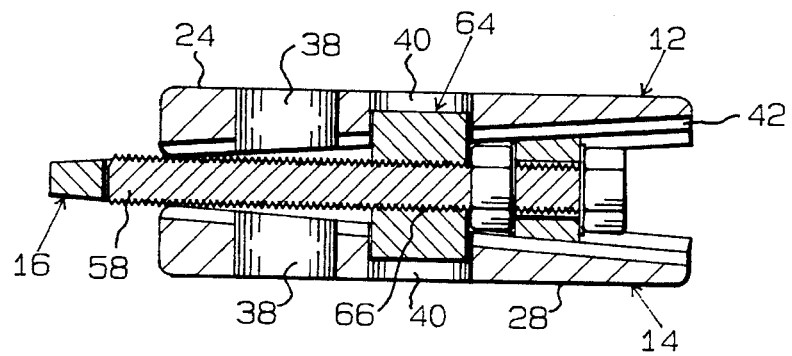
FIG. 8 is an elevational sectional view similar to FIG. 7 illustrating the actuating wedge moved to the left to define the maximum vertical wedge dimension with the nut within the illustrated set of openings as shown in FIG. 7.

If it is desired to assemble the mount 10 in order to produce the minimum vertical dimension the nut 64 will be located within the set of openings defined by aligned openings 40 as shown in FIG. 7, and when the nut 64 is located adjacent the left end of the shaft 58 the actuating wedge 16 will be moved to its maximum extent to the right relative to wedges 12 and 14 permitting the upper and lower wedges to move toward each other producing the minimum dimension possible between the surfaces 24 and 28. With the primary nut 64 located within nut openings 40 rotation of the shaft 58 to the maximum extent into the nut 64 will produce the relationship shown in FIG. 8 wherein the vertical dimension of mount 10 is greater than that illustrated in FIG. 7 and in FIG. 4.

Figure 9:
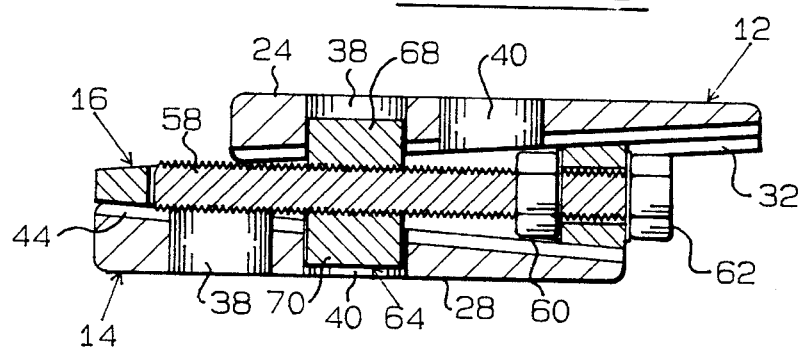
FIG. 9 is an elevational sectional view along the longitudinal axis illustrating the nut received within the left nut opening of the upper wedge and the right nut opening of the lower wedge.

A third mode of assembly of the wedges 12, 14, and 16 is shown in FIG. 9 wherein the upper portion 68 of the nut 64 is located within the nut receiving opening 38 of the upper wedge 12 while the lower portion 70 of the nut 64 is located within the nut receiving opening 40 of the lower wedge 14. This mode of assembly will shift the relationship of the wedges 12 and 14 with respect to each other in a longitudinal direction, and the set of nut receiving openings associated with the nut 64 will now be defined by opening 38 in wedge 12 and opening 40 in wedge 14. The mode of assembly shown in FIG. 9 will permit the actuating wedge 16 to be translated along its longitudinal axis relative to the wedges 12 and 14 in the manner described above, yet due to the relative displacement of the wedges 12 and 14 this mode of assembly provides an additional vertical adjustment of the dimension of the mount 10 to increase the range of adjustment without modifying the length of the wedges or screw. Of course, it will be appreciated that an equivalent initial dimensional relationship to that of FIG. 9 can be produced if the upper portion 68 of nut 64 is located within opening 40 of wedge 12 and the nut portion 70 is located within opening 38 of wedge 14.

Accordingly, it will be appreciated that the inventive concepts permit the wedges 12–16 to be assembled in four different arrangements which permits a wide range of initial and final vertical adjustment of the mount. With the practice of the invention it is possible to achieve a wide range of vertical adjustment with wedges having relatively short longitudinal lengths, and likewise the length of the threaded screw shaft may be minimized with respect to the degree of adjustment achieved. The assembly of the nut 64 into the desired nut openings 38 and 40 is readily accomplished without retiring special skills, and as the wedges 12 and 14 are identical manufacturing and fabricating costs are reduced.

It is appreciated that various modifications to the inventive concepts may be apparent to those skilled in the art without departing from the spirit and scope of the invention.

I claim:

1. A vertically adjustable machinery mount comprising, in combination, an upper wedge having a lower planar cam surface, a lower wedge having an upper planar cam surface, an actuating wedge located between said upper and lower wedges having an upper planar cam surface engaging said upper wedge lower cam surface and a lower planar cam surface engaging said lower wedge upper cam surface, said wedges each having a longitudinal axis and the axes of said wedges being substantially parallel to each other, the plane of the cam surfaces each of said wedges being oblique to the longitudinal axis thereof, an elongated threaded shaft having an axis of rotation rotatably mounted on said actuating wedge parallel to said longitudinal axis thereof and axially fixed thereto, said shaft having an accessible torque drive end permitting said shaft to be selectively rotated, first aligned nut receiving openings defined within said upper and lower wedges and intersecting said cam surfaces of said upper and lower wedges, second aligned nut receiving openings defined within said upper and lower wedges intersecting said cam surfaces of said upper and lower wedges, said first and second nut receiving openings defined in each of said upper and lower wedges being spaced with respect to each other along the longitudinal axis of the associated wedge, and a nut threaded upon said shaft and selectively received within one of said openings in said upper wedge and one of said openings within said lower wedge and restrained against rotation in said openings whereby selective positioning of said nut within said openings provides a preliminary adjustment of the longitudinal position of said actuating wedge to said upper and lower wedges and rotation of said shaft longitudinally translates said shaft within said nut and provides a fine final adjustment of the longitudinal position of said actuating wedge to said upper and lower wedges to determine the final spacing between said upper and lower wedges and the vertical dimension of said machinery mount.

2. In the vertically adjustable machinery mount as in claim 1, said nut receiving openings each having a longitudinal axis intersecting said shaft axis of rotation.

3. In the vertically adjustable machinery mount as in claim 2, the longitudinal axes of said first and second nut receiving openings being parallel.

4. In the vertically adjustable machinery mount as in claim 1, said nut receiving openings being cylindrical, said nut being cylindrical and closely received within the associated nut receiving openings.

5. In the vertically adjustable machinery mount as in claim 1, said upper and lower wedges and said actuating wedge each having spaced lateral edges parallel to the associated wedge longitudinal axis, the spacing between said lateral edges of said upper and lower wedges being equal, an elongated flange defined upon each lateral edge of said upper and lower wedges, said flanges defined upon said upper wedge extending downwardly below said upper wedge lower cam surface, said flanges defined upon said lower wedge extending upwardly above said lower wedge upper cam surface, said actuating wedge lateral sides being spaced apart a distance less than the spacing of said flanges on said upper and lower wedges to permit said upper and lower wedge's flanges to partially enclose said actuating wedge lateral sides permitting said flanges to guide movement of said actuating wedge between said upper and lower wedges' longitudinal axes.

* * * * *